(12) United States Patent
Whitehead

(10) Patent No.: US 6,417,446 B1
(45) Date of Patent: Jul. 9, 2002

(54) CONCEALED SERVICE POKE-THROUGH DEVICE

(75) Inventor: James H. Whitehead, Collierville, TN (US)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 09/215,596

(22) Filed: Dec. 17, 1998

(51) Int. Cl.[7] ............................................. H02G 3/04
(52) U.S. Cl. ......................................... 174/48; 52/220.8
(58) Field of Search ...................... 174/48, 57; 439/135, 439/538; 52/220.8

(56) References Cited

U.S. PATENT DOCUMENTS

| | | | |
|---|---|---|---|
| 3,864,883 A | 2/1975 | McMarlin | 52/221 |
| 4,243,835 A | 1/1981 | Ehrenfels | 174/48 |
| 4,264,779 A | 4/1981 | Rhodes et al. | 174/48 |
| 4,323,724 A | 4/1982 | Shine | 174/48 |
| 4,331,832 A | 5/1982 | Curtis et al. | 174/57 |
| 4,336,416 A * | 6/1982 | Goodsell | 174/48 |
| 4,477,694 A | 10/1984 | Kohaut | 174/48 |
| 4,496,790 A | 1/1985 | Spencer | 174/48 |
| 4,545,631 A | 10/1985 | Zampini | 339/14 R |
| 4,573,297 A | 3/1986 | Benscoter et al. | 52/221 |
| 4,583,779 A | 4/1986 | Wiley | 339/14 R |
| 4,770,643 A | 9/1988 | Castellani et al. | 439/135 |
| 4,780,571 A | 10/1988 | Huang | 174/48 |
| 4,783,577 A * | 11/1988 | Mohr | 174/48 |
| 4,827,080 A | 5/1989 | Castellani et al. | 174/48 |
| 4,932,179 A | 6/1990 | Sosinski | 52/220 X |
| 5,003,127 A | 3/1991 | Sosinski et al. | 174/48 |
| 5,032,690 A * | 7/1991 | Bloom | 174/48 |
| 5,107,072 A | 4/1992 | Morgan | 174/48 |
| 5,124,876 A | 6/1992 | Misencik et al. | 361/117 |
| 5,167,530 A | 12/1992 | Wallgren et al. | 439/540 |
| 5,393,930 A | 2/1995 | Wuertz | 174/48 |
| 5,410,103 A | 4/1995 | Wuertz | 174/48 |
| 5,451,714 A | 9/1995 | Duffie | 174/48 |
| 5,467,565 A * | 11/1995 | Bowman et al. | 52/220.8 X |
| 5,641,940 A | 6/1997 | Whitehead | 174/48 |

OTHER PUBLICATIONS

Thomas & Betts Technical/Specification Catalog, pp. J/871–J/877 (1996).

* cited by examiner

Primary Examiner—Dean A. Reichard
(74) Attorney, Agent, or Firm—Hoffmann & Baron, LLP

(57) ABSTRACT

A poke-through device for installation in a hole extending through a concrete floor structure of a building. The device provides a four-plug arrangement, together with two data connection jacks, all located in a concealed manner. The device alternatively provides a two-plug arrangement, together with four data connection jacks. An additional alternative embodiment provides an arrangement having six data connection jacks.

35 Claims, 13 Drawing Sheets

CONCEALED SERVICE POKE-THROUGH DEVICE

BACKGROUND OF THE INVENTION

The present invention relates generally to electrical connections. More particularly, the present invention relates to a concealed service poke-through device.

Much activity has been devoted to avoiding the necessity of using on-floor conduits for conveying electrical power and communication lines to floor locations which were not within the original architectural and electrical planning of a facility, such as a multi-floor concrete building. Such on-floor conduits are unsightly and may also pose a safety hazard to persons working in such area.

One technique for avoiding the use of on-floor conduits involves the drilling of a hole through the concrete floor at a desired location and the routing of power or communication lines beneath the floor and then up through the hole. Transition apparatus known as "poke-throughs" have been developed for use in such interfloor holes. Such poke-throughs are subject to electrical and fire safety considerations. Among these are two fire-related requirements. First, the poke-through cannot function as a chimney or fire-advancing flue in the event of a fire on the lower floor. Second, the poke-through cannot function as a floor-to-floor heat conduction path.

These safety requirements have largely been met through the use of intumescent material. For example, co-assigned U.S. Pat. Nos. 5,003,127 and 5,107,072 disclose a poke-through assembly wherein a sheet of intumescent material is wired in place about a housing, and expands to fill and block the interfloor hole in the event of fire. Furthermore, thermally insulating materials have been interposed between metallic (and therefore heat conductive) portions of the poke-through devices. Thus, poke-through devices have come into common use.

With greater use of poke-through devices, there is, of course, interest in making their manufacturing economical, their installation easier and faster, and their retention more positive. The United States Patent of James H. Whitehead, entitled "Poke-Through Electrical Connection Assembly Retainer," U.S. Pat. No. 5,641,940, presents a solution to the problems of rapid installation, positive retention, and economical manufacturing. The '940 patent discloses a self-anchoring poke-through electrical connection assembly retainer, as well as a pre-formed intumescent material structure which is easy to apply during the manufacturing process.

However, problems still remain with the use of poke-through devices. One such problem involves the limited number of electrical interfaces provided by the prior art devices. It will be recognized that the size of the hole which may be drilled through a concrete floor is limited by the structural characteristics of the floor. Typically, building codes allow the drilling of a hole having a diameter between about two and four inches, which thus limits the maximum size of the poke-through device. However, even utilizing the mentioned four inch diameter hole, prior art devices only provide a limited number of electrical interfaces. For example, a single prior art poke-through device typically provides only a two-plug arrangement.

Although poke-through devices have succeeded in permitting removal of electrical power and communication lines from above-floor locations, all known poke-through devices still have outlet or connector boxes located flush with, or above, floor level. Heretofore, mounting of connectors below floor level, without an outlet or connector box located flush with, or above, floor level, has only been possible with complicated structures which must be pre-built or pre-cast into the floor, such as that disclosed in U.S. Pat. No. 3,864,883 to McMarlin.

U.S. Pat. No. 4,770,643 to Castellani et al. discloses a poke-through with an outlet which is generally flush with floor level. However, connectors plugged into the outlet are still above floor level and pose a tripping hazard. Such connectors are also prone to dislodgment by pedestrian traffic. More to the point, outlets and other electrical interfaces such as data connection jacks in flush devices are prone to damage from pedestrian traffic and/or placement and movement of furniture. For example, stepping upon or even temporarily placing a piece of furniture upon a data connection jack can permanently damage such jack.

There is therefore a need in the prior art for a concealed service poke-through device providing multiple electrical interfaces, and which permits mounting of electrical outlets or data connections jacks below floor level without an unsightly above-floor-level outlet or connector box which may pose a tripping hazard to personnel or interfere with placement of furniture on the floor and without a flush outlet which still leaves connectors exposed.

SUMMARY OF THE INVENTION

The present invention, which addresses the needs of the prior art, relates to a concealed poke-through device for installation in a hole in a floor structure. The floor structure defines a floor in a first working environment and a ceiling in a second working environment. The second working environment includes a junction box. The concealed poke-through device includes a body having upper and lower ends and which is sized for insertion within the hole. The upper end includes a generally circular receptacle-mounting region. The mounting region defines four substantially equal-size locating quadrants. At least one of the quadrants includes two electrical outlets. Finally, the lower end of the body communicates with the junction box whereby electrical power may be supplied to the outlets.

The present invention also relates to a recessed poke-through device for installation in a floor structure. The floor structure defines a floor in a first working environment and a ceiling in a second working environment. The second working environment includes a junction box. The recessed poke-through device includes a tubular body having upper and lower ends and which is sized for insertion within the hole. The upper end defines an interface mounting region. The lower end is adapted to electrically communicate with the junction box. The poke-through device also includes an intumescent sleeve surrounding the body. The poke-through device further includes an electrical interface mounted in the interface mounting region. The interface has an upper surface facing the floor. The upper surface is spaced a distance below the floor. Finally, the poke-through device includes a cover assembly including a floor plate and at least one access door. The door is movable between a closed position wherein the interface is enclosed within the device and an open position wherein the interface may be accessed through the hole. The door has an inner surface which defines a plane parallel to the upper surface when the door is in the closed position. The upper surface of the interface is recessed a distance below the plane of the door when the door is in the closed position whereby application of forces to the closed door does not transfer forces to the interface.

The present invention further relates to a concealed poke-through device for installation in a hole in a floor structure.

The floor structure defines a floor in a first working environment and a ceiling in a second working environment. The second working environment includes a junction box. The concealed poke-through device includes a body having upper and lower ends and which is sized for insertion within the hole. The lower end communicates with the junction box. The poke-through device also includes a spacer secured to the upper end of the body and which defines an interface mounting region. The poke-through device further includes a plurality of electrical interfaces mounted in the interface mounting region. The electrical interfaces are selected from the group consisting of electrical outlets and data jacks. Finally, the spacer includes a channel extending across the center of the spacer for receiving electrical wires from a first electrical interface located on a first side of the mounting region and for directing the wires to a second side of the region opposite the first side.

The present invention additionally relates to the combination of a floor structure and a recessed poke-through device. The floor structure includes upper and lower surfaces defining a floor thickness and having a poke-through receiving hole formed therein. The receiving hole extends in a direction generally perpendicular to the upper and lower surfaces. The recessed poke-through device includes a body having upper and lower ends and which is sized for insertion within the hole. The upper end defines an interface mounting region. The lower end is adapted to electrically communicate with the junction box. The poke-through device also includes an electrical interface mounted in the interface mounting region. The interface has an upper surface facing the floor. The poke-through device further includes a cover assembly including a floor plate and at least one access door. The door is movable between a closed position wherein the interface is enclosed within the device and an open position wherein the interface may be accessed through the hole. The door has an inner surface which defines a plane parallel to the upper surface when the door is in the closed position. The upper surface of the interface is recessed a distance below the plane of the door when the door is in the closed position whereby forces applied to the door are not transferred to the interface. Finally, the interface is retained in the receiving hole at a distance below the upper surface of the floor structure which is sufficient to prevent the interface, and a typical connector secured thereto, from interfering with objects and persons located on the upper surface of the floor structure.

Finally, the present invention relates to a method of assembling a poke-through device for insertion in a hole in a floor structure. The method includes the step of providing a body having upper and lower ends and sized for insertion within the hole. The body defines an interior volume. The method includes the additional step of filling at least a portion of the interior volume of the body with a liquid intumescent material which thereafter sets and hardens within the body. The method includes the further step of forming at least one passage through the hardened material. Finally, the method includes the step of securing a first electrical interface having a first set of electrical wires extending therefrom to the upper end of the body and routing the first set of wires through the passage.

As a result, the present invention provides a concealed service poke-through device. The device permits an electrical interface, such as an outlet or data jack, to be located below floor level, such that unsightly and dangerous above-floor outlet boxes or connector boxes are not required, and such that connectors themselves may also be safely located at least substantially below floor level.

DETAILED DESCRIPTION OF THE INVENTION

Figure 1:
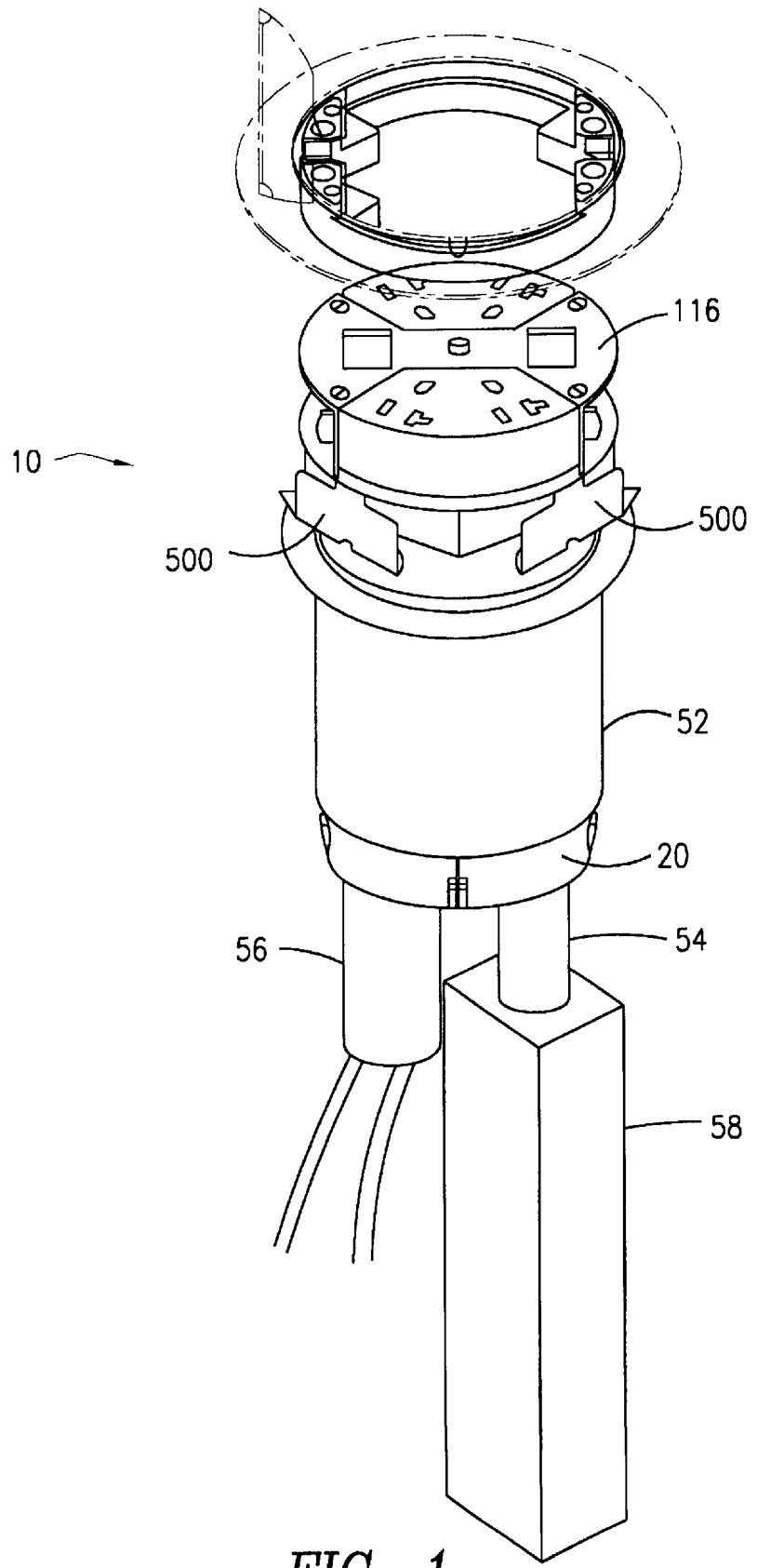
FIG. 1 is a perspective view, partially exploded, of a recessed poke-through device according to the present invention.

Referring initially to FIG. 1, a poke-through device, designated generally as 10, is sized and configured to provide a four-plug arrangement, together with two data connection jacks, all located in a concealed manner. The term "concealed" is intended to encompass both flush mounted poke-through devices and recessed poke-through devices. In the preferred poke-through device 10 of FIG. 1, both the receptacles and the data jacks are recessed below the plane defining the surface of the floor. Although the present application refers generally to running of electrical power and data cables, it is to be understood that fiber optic cables or similar structures are also within the scope of the invention.

Figure 2:
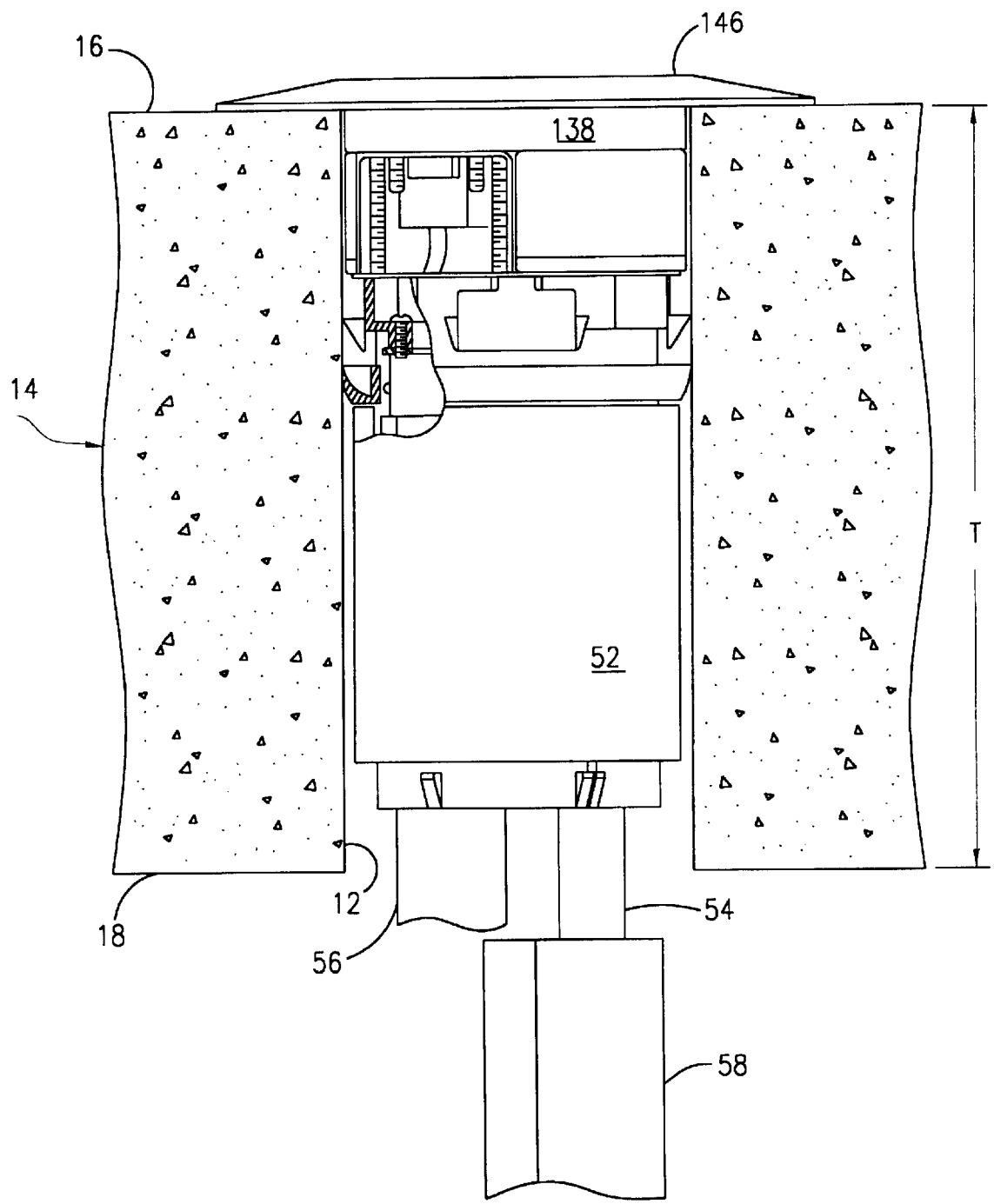
FIG. 2 is an elevational view in partial section showing the poke-through device of FIG. 1 installed within a concrete floor.

As shown in FIG. 2, device 10 is sized and configured for installation in an device-receiving hole 12 extending through a floor structure 14, typically formed of concrete. As will be appreciated by those skilled in the art, poke-throughs are used to add and/or supplement electrical power and data capability in existing buildings. Accordingly, the floor structures in question are not pre-built or pre-cast with underfloor passages for routing of wires. Thus, holes 12 are drilled through existing floor structures of existing buildings.

Floor structure 14 defines a floor 16 in a first working environment and a ceiling 18 in a second working environment. As a result, power and communication lines may be routed from the second working environment located below floor structure 14 up through hole 12 to device 10 positioned therein. It will be appreciated that floor 16 and ceiling 18 together define a floor thickness T and that hole 12 extends in a direction generally perpendicular to floor 16 and ceiling 18. Inasmuch as floor structure 14 is typically a structural, load bearing member of the building, the maximum size of the interfloor is limited by building code requirements. In particular, interfloor holes, typically range in diameter from two to four inches. In one preferred embodiment, hole 12 is formed with a four inch diameter.

Referring additionally to FIGS. 3A–3D, device 10 includes a tubular body 20 (preferably formed of a phenolic material for heat resistance) having body halves 22a, 22b. A mounting plate 24 is located at upper end 26 of body 20, while a conduit plate 28 is located at lower end 30 of body 20. In this regard, the body is preferably formed with a pair of circumferentially-surrounding grooves 32 proximate the upper and lower ends for attachment of the mounting plate and conduit plate, respectively, thereon. Conduit plate 28 includes a pair of threaded apertures 34, 36. Finally, both plates include a pair of indexing keys 38 to ensure that apertures 34, 36 are aligned with apertures 40, 42, respectively, located in mounting plate 24 when body 20 is assembled.

Figure 7:
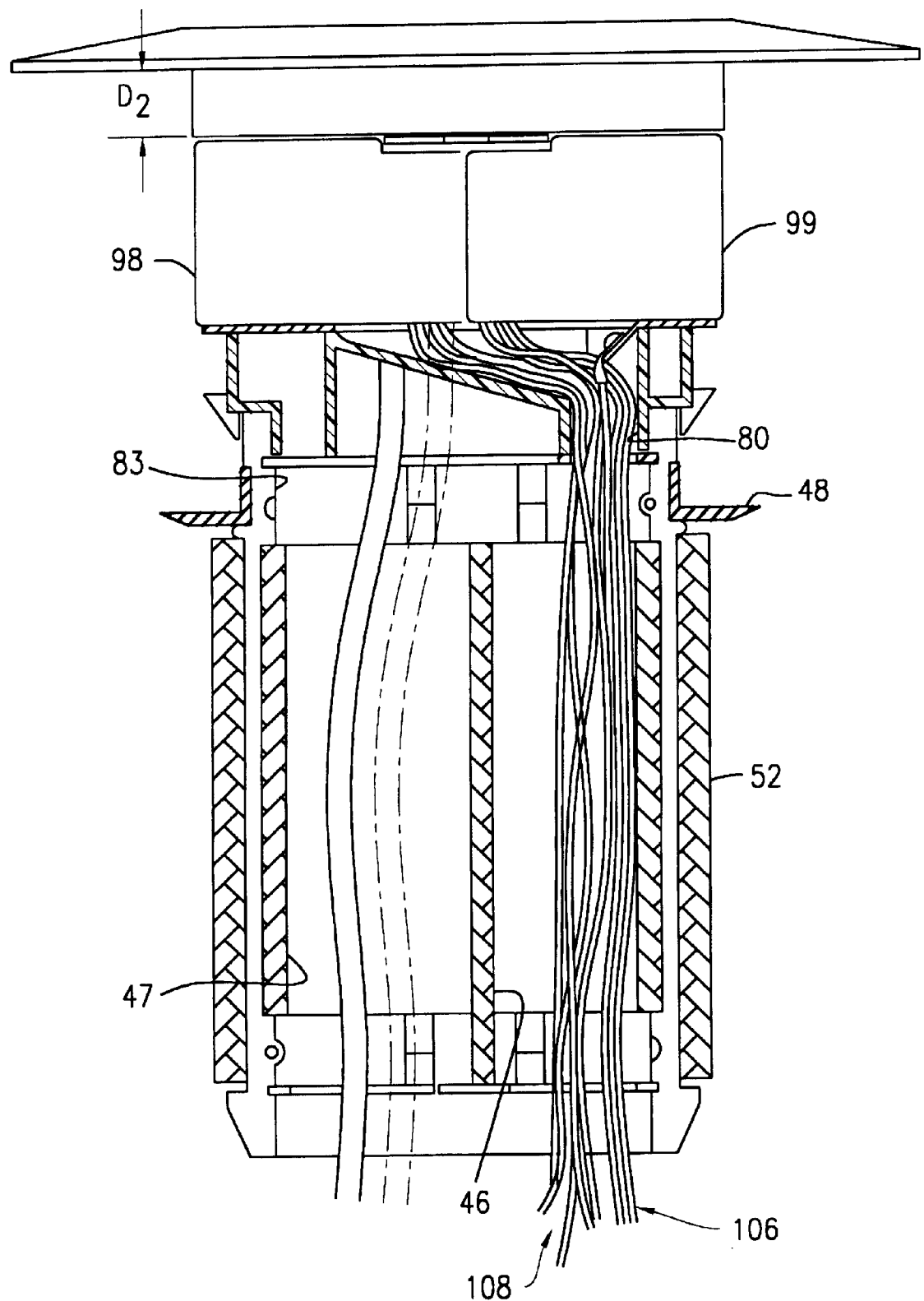
FIG. 7 is an elevational view in partial section of the poke-through device of FIG. 1.

Body 20 further includes dividers 44, 45 (preferably formed from intumescent material) which together define two passages within body 20, i.e., a first passage 46 extending between apertures 42 and 36, and a second passage 47 extending between apertures 40 and 34 (see FIG. 7). In this manner, a plurality of electrical wires extending through the first passage remain spaced and electrically insulated from a plurality of data wires extending through the second passage. A rubber smoke ring 48 is fitted within a groove 50 about upper end 26 of body 20. An intumescent sleeve 52 is then positioned about body 20. As will be recognized by those skilled in the art, intumescent sleeve 52 is utilized to meet the fire/smoke criteria required of poke-through devices.

A first conduit, i.e. conduit 54, is adapted to be threadingly engaged with threaded aperture 36, while a second conduit, i.e., conduit 56 is adapted to be threadingly engaged with threaded aperture 34. The opposing end of the first conduit 54 may be secured to a junction box 58 in conventional manner. The opposing end of the second conduit 56 may be secured to a second junction box (not shown) or coupled to an additional length of conduit.

Figure 4:
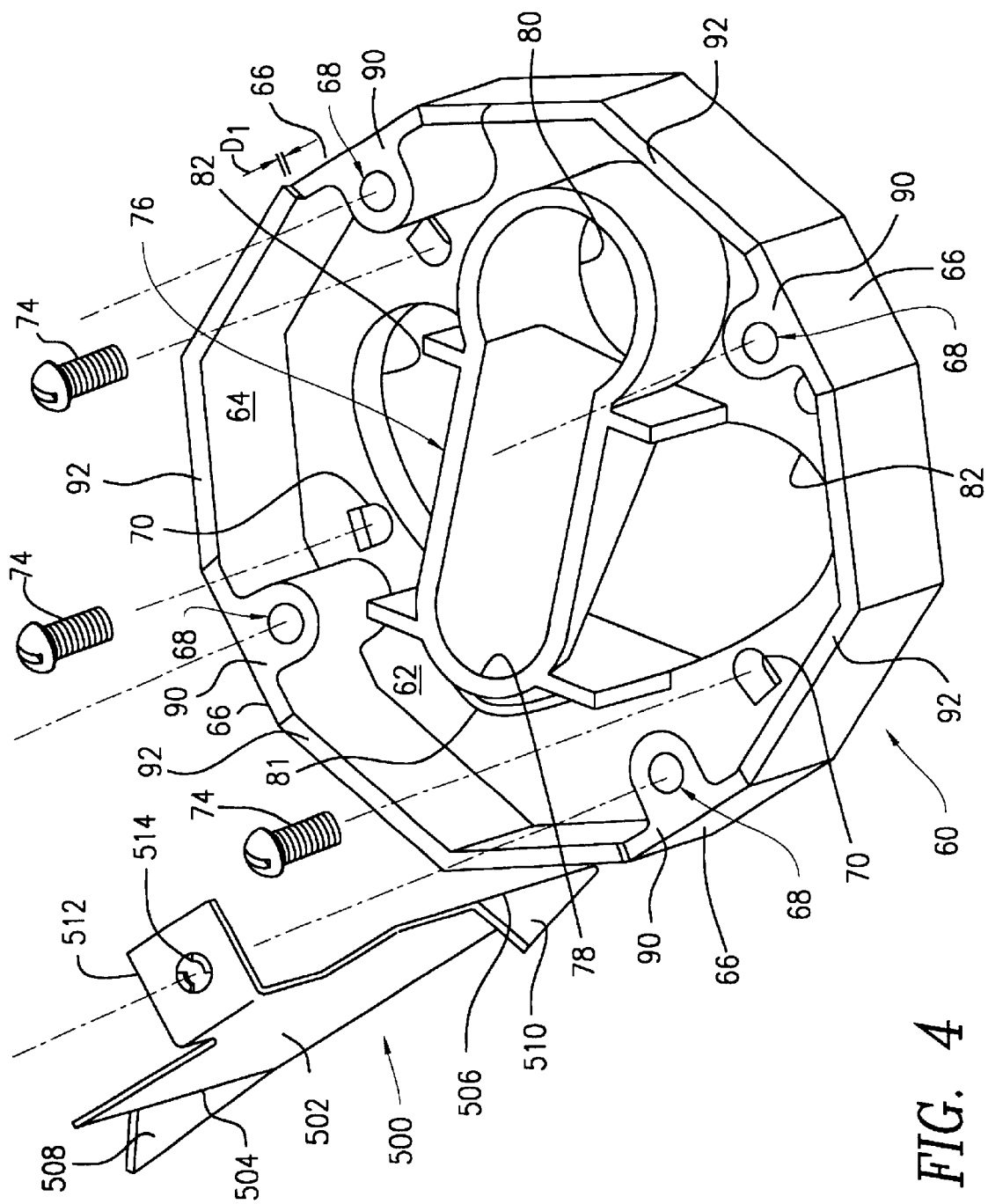
FIG. 4 is an enlarged detail of the spacer of the poke-through device of FIG. 1.

Referring additionally to FIG. 4, a spacer 60 (also formed of a phenolic material for heat resistance) is located at upper end 26 of body 20. Spacer 60 has a generally dish-shaped configuration, including a bottom wall 62 surrounded by a side wall 64. In one preferred embodiment of spacer 60, side wall 64 is multifaceted and defines a plurality of clip-abutting wall surfaces 66. Each of these clip-abutting wall surfaces adjoins a threaded boss 68.

Bottom wall 62 of spacer 60 includes a plurality of horseshoe-shaped apertures 70 spaced thereabout. Apertures 70 are located for alignment with a plurality of threaded holes 72 formed in mounting plate 24. Accordingly, spacer 60 is secured to mounting plate 24 via four screws 74 which extend through apertures 70 and threadingly engage holes 72 of mounting plate 24.

Spacer 60 includes a wire-receiving channel 76 extending between a first elevated end 78 and terminating at aperture 80. Spacer 60 further includes an aperture 81 located adjacent elevated end 78 of channel 76, and an elongated aperture 82 which extends under channel 76 and thus is continuous from one side of the spacer to the other. As will be explained further hereinbelow, the novel configuration of spacer 60 facilitates the assembly of the poke-through device by directing electrical wires to one of the two passages defined in body 20 and directing the data cables to the other of the two passages defined in body 20.

Spacer 60 further includes a circumferentially-extending lip 83 (see FIG. 7) projecting downward from the lower surface of bottom wall 62. The outer circumference of this lip is sized to cooperate with the inner diameter defined by body 20 at upper end 26 thereof. In this fashion, spacer 60 is located on the upper portion of body 20 prior to the installation of screws through apertures 70 of bottom wall 62.

Device 10 preferably includes at least one retainer clip 500 having an angled projection configured to permit easy insertion of the device into an interfloor receiving hole, and to substantially prevent subsequent withdrawal of the device from the hole. Preferably, at least two opposed clips 500 are provided, and most preferably, four of the clips 500, each separated by about 90 degrees, are provided on the poke-through device. The clips are positioned on the spacer at clip-abutting wall surfaces 66. In one preferred embodiment, clips 500 are made of type 302 spring temper stainless steel, in a thickness of about 0.015 inches.

Figure 3A:
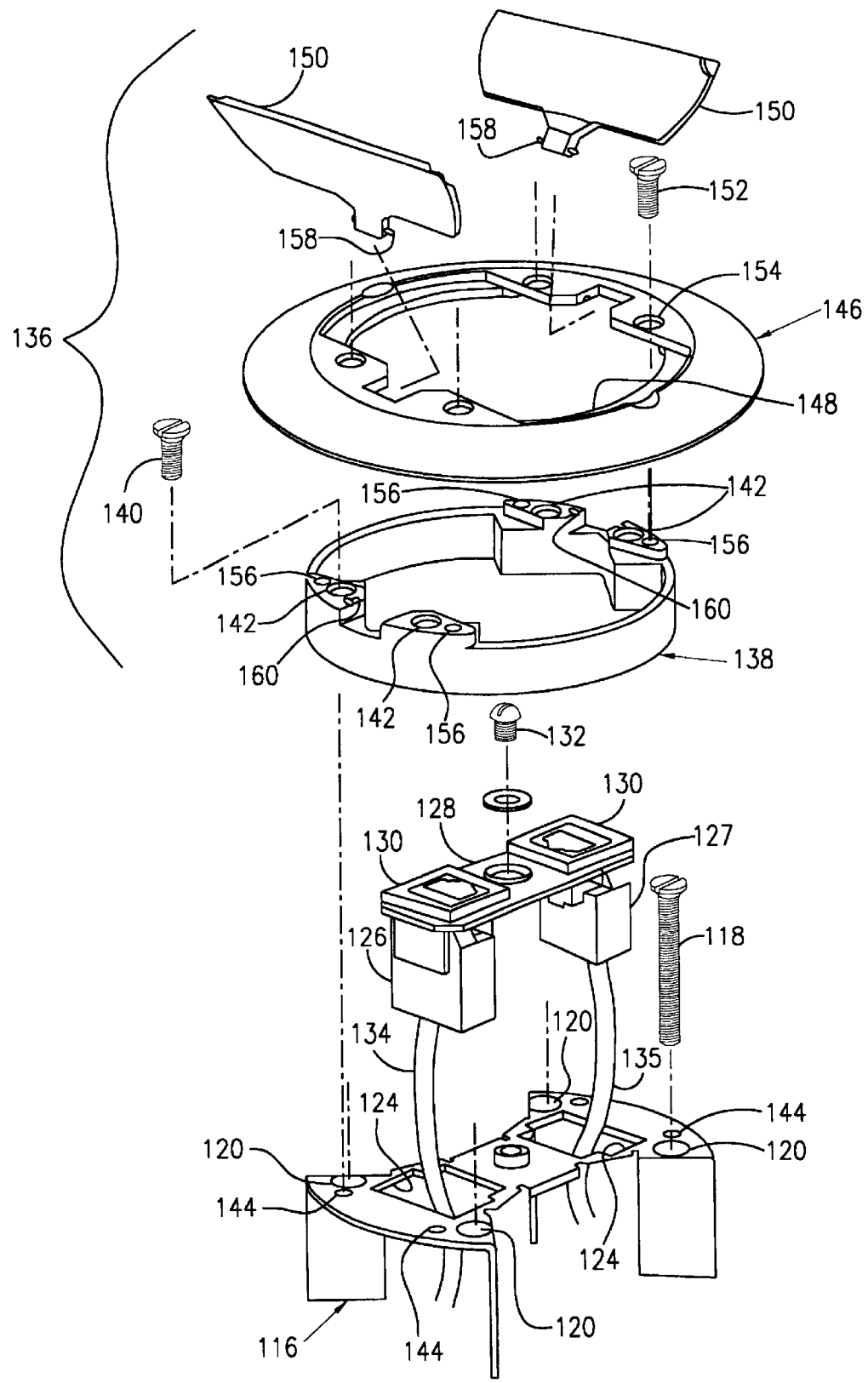
FIGS. 3A–3D are exploded perspective views of the poke-through device of FIG. 1.
Figure 3B:
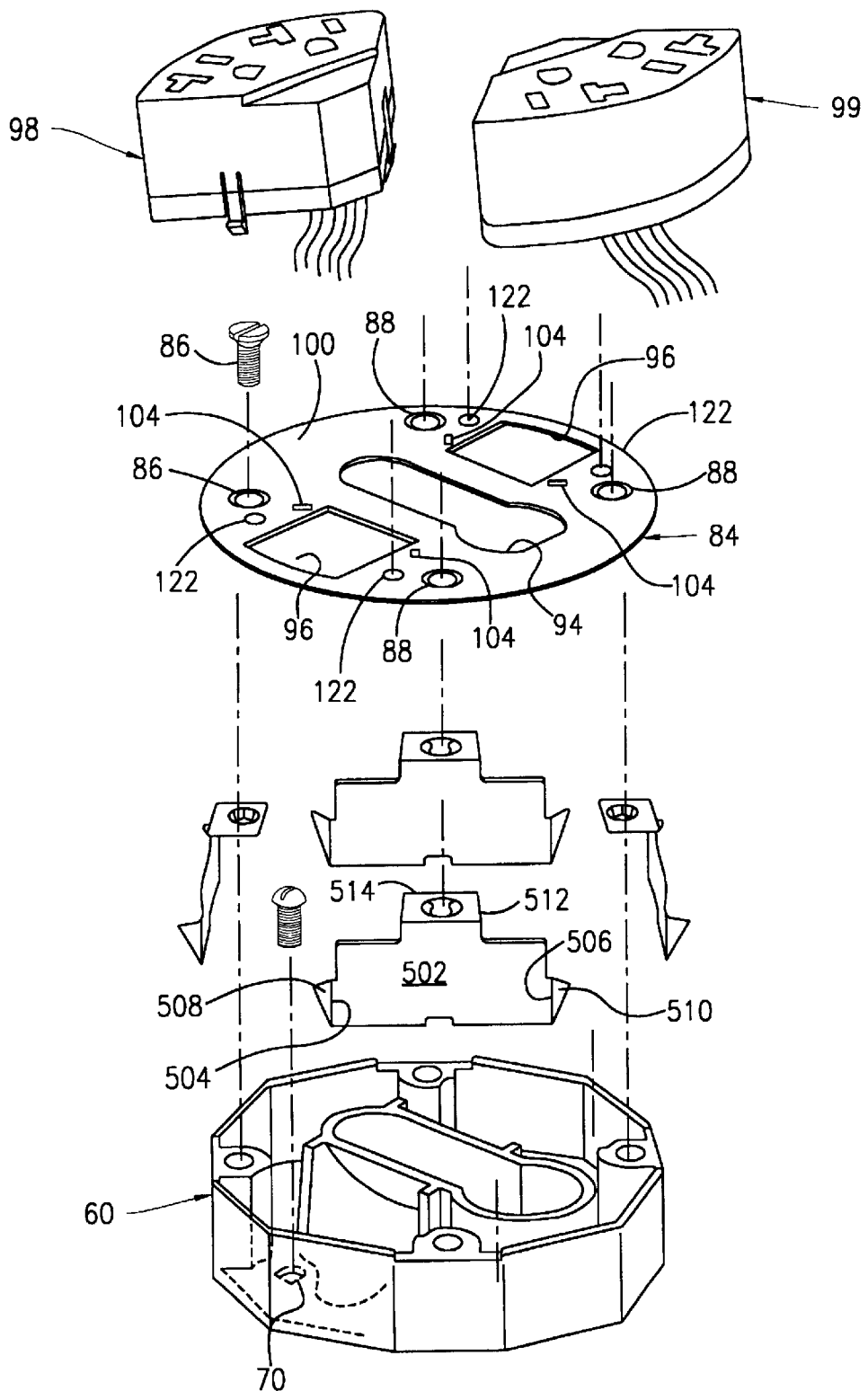
Figure 3C:
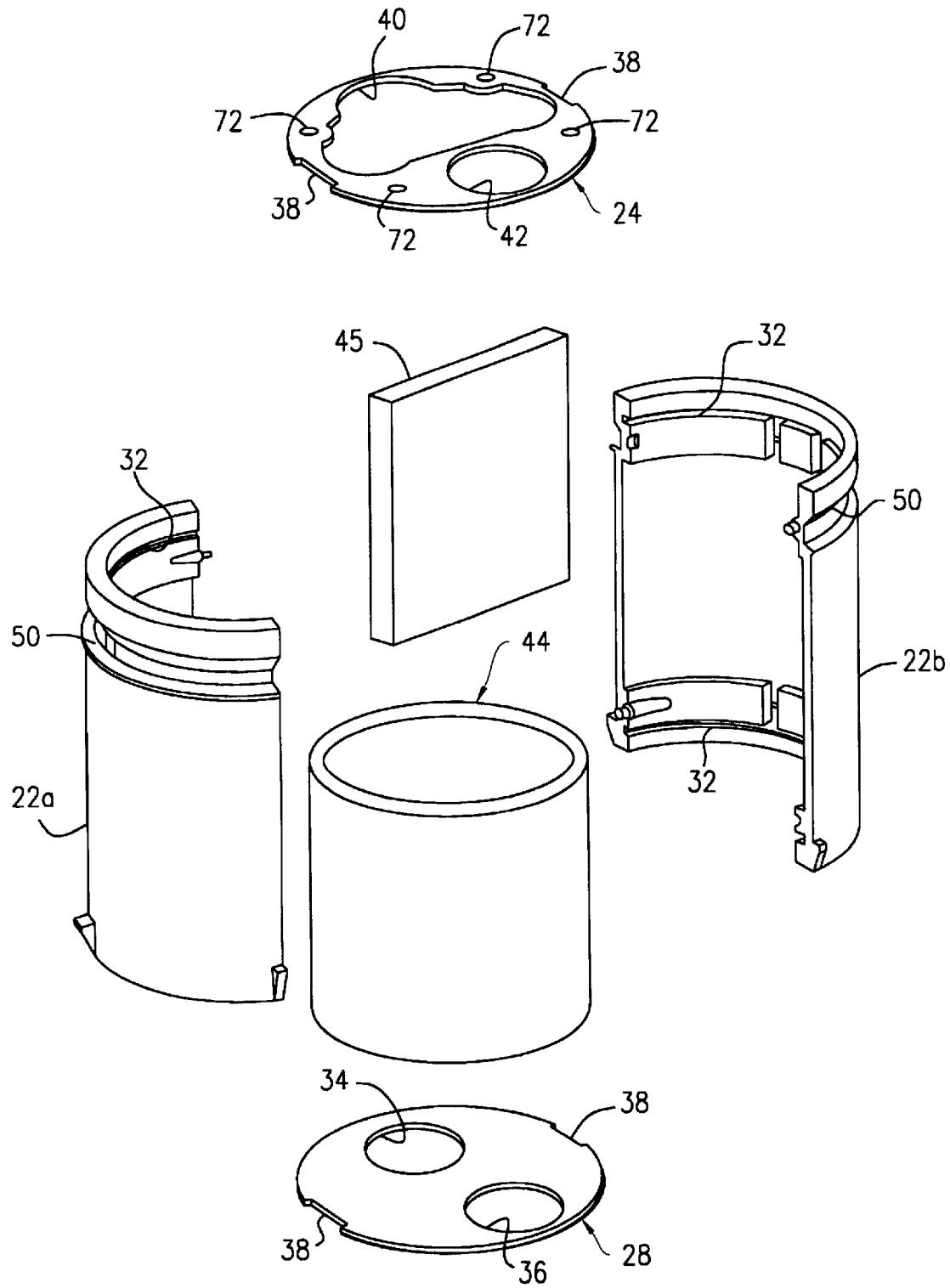
Figure 3D:
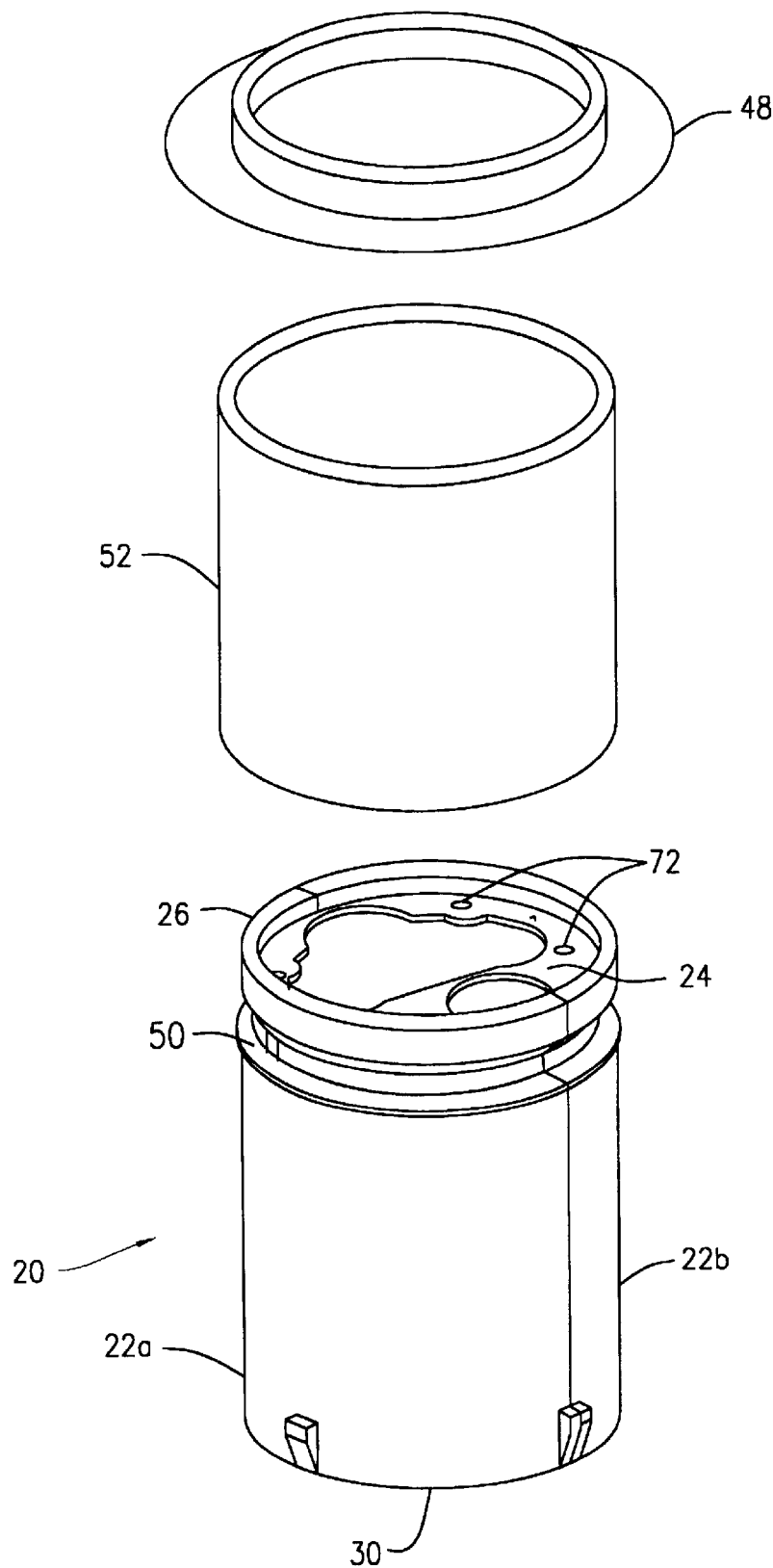

Complete details of clip 500 are provided in U.S. Pat. No. 5,641,940, the disclosure of which is incorporated herein by reference. Referring to FIGS. 3B and 4, clip 500 includes a flexure portion 502 having a first edge 504 and a second edge 506. First and second anchor points 508, 510 are fastened at edges 504, 506 respectively. Anchor points 508, 510 are in the form of angled projections. Flexure portion 502 may be formed with one or more strengthening ribs (not shown).

Clip 500 preferably includes an upper mounting bracket 512 formed with a hole 514. Bracket 512 is preferably sandwiched between a receptacle plate 84 and spacer 60, and secured therebetween by a plurality of screws 86, each of which passes through hole 88 of receptacle plate 84, through hole 514 of bracket 512 and into threading engagement with boss 68. As shown, surfaces 90 are stepped a distance $D_1$ ($D_1$ being approximately equal to the thickness of bracket 512) from surface 92 to allow sandwiching of bracket 512 between spacer 60 and receptacle plate 84.

Receptacle plate 84 further includes an elongated centrally-located key-shaped aperture 94 configured to allow access to channel 76. Moreover, receptacle plate 84 includes cut-outs 96 at opposing sides thereof to allow access to aperture 82 once such receptacle plate is installed to spacer 60. Receptacles 98, 99 are thereafter secured to upper surface 100 of receptacle plate 84. In this regard, each of the receptacles may include a plurality of locking alignment feet 102 which engage alignment holes 104 formed in receptacle plate 84 (see also FIG. 8).

Figure 5:
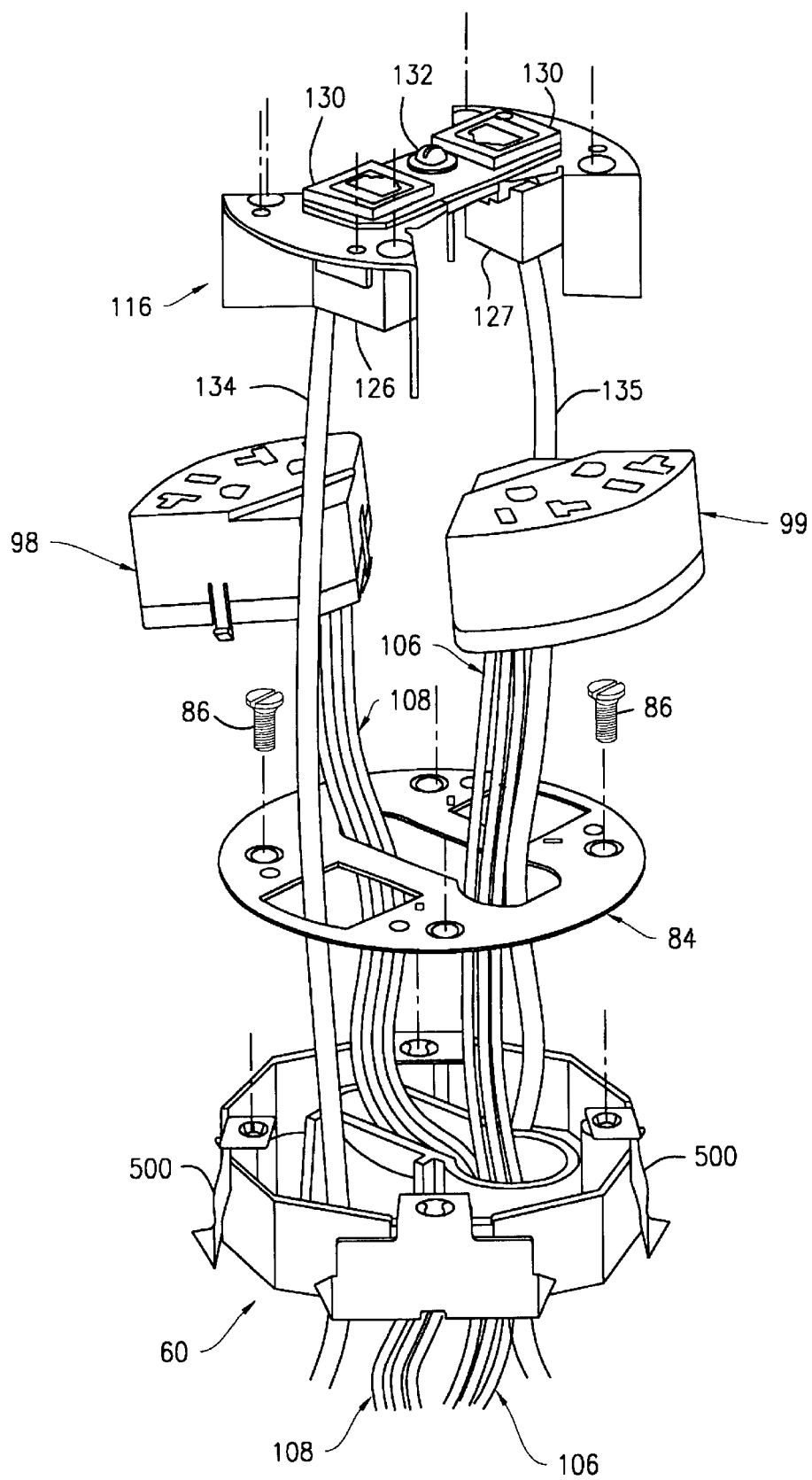
FIG. 5 is an enlarged, exploded detail of the poke-through device of FIG. 1.

As best shown in FIG. 5, one of the receptacles, i.e., receptacle 99, is located substantially directly above aperture 80 such that the electrical wires communicating with such receptacle, designated generally as 106, extend substantially directly downward through such aperture and into first passage 46 defined by body 20. The other receptacle, i.e., receptacle 98, is located above elevated end 78 of channel 76. Accordingly, the electrical wires communicating with such receptacle, designated generally as 108, extend downward into the channel and are thereby directed across the spacer to aperture 80, and in turn into first passage 46 of body 20. In this fashion, the electrical wires communicating with receptacles located on opposing sides of the poke-through device are grouped together for travel through a common passage defined within body 20 (see FIG. 7).

As shown, the receptacles are preferably formed as separate wedge-shaped units, each including two electrical outlets. The electrical outlets, i.e., outlets 114, are configured for receipt of conventional 110 voltage electrical plugs. Of course, the outlets may be configured for receipt of various other electrical plugs. Alternatively, the receptacle may be formed as a single "bow-tie" shaped four-plug unit (receptacle 98'). As will be described further hereinbelow, the embodiment of FIGS. 1–5 not only includes a concealed four-plug arrangement, but additionally includes two concealed data jacks.

Figure 8:
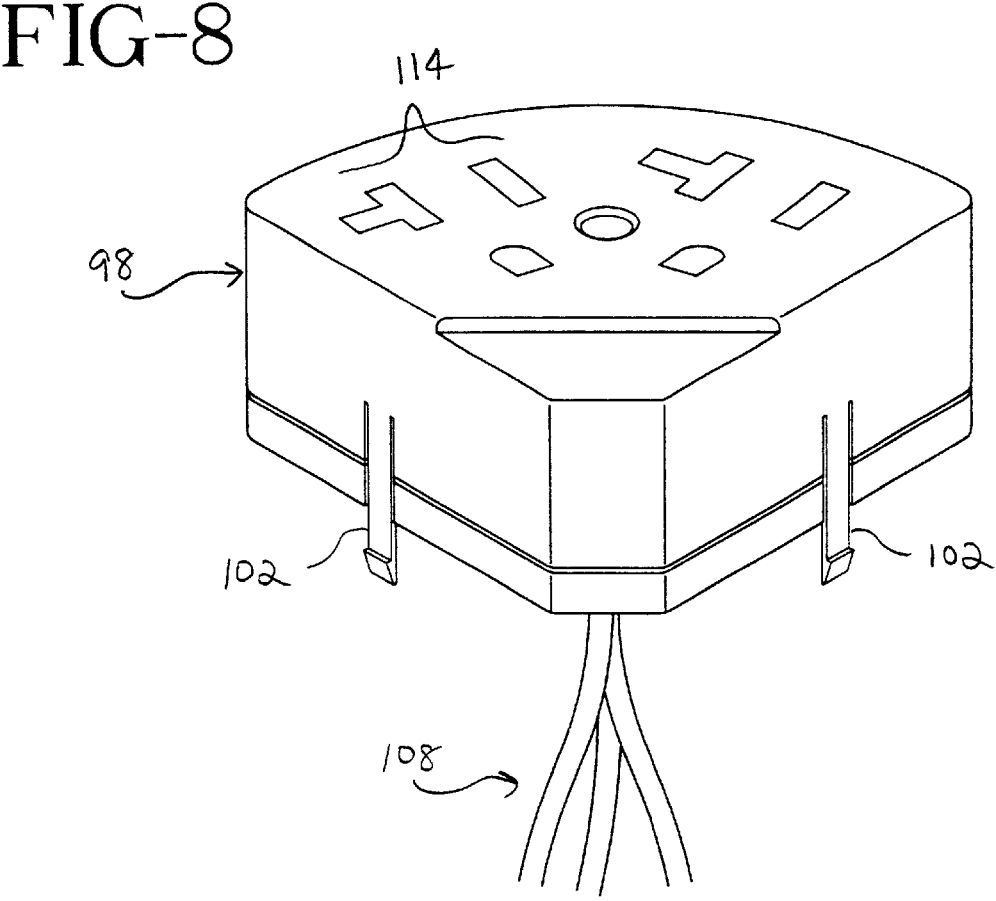
FIG. 8 is an enlarged detail of the wedge-shaped receptacle used in the poke-through device of FIG. 1.
Figure 8A:
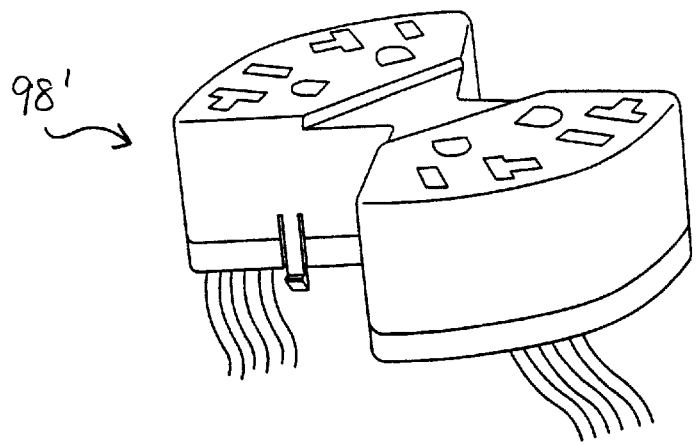
FIG. 8A shows the wedge-shaped receptacle in further detail.

Device 10 further includes a data jack support platform 116 secured to receptacle plate 84 via four screws 118. More particularly, platform 116 includes four apertures 120 which are located to cooperate with four threaded holes 122 (see FIG. 3B) in receptacle plate 84. As best shown in FIG. 1, the configuration of platform 116 allows access to the receptacles when such platform is mounted to the receptacle plate. As shown in FIG. 8, each receptacle includes a recessed surface which allows a portion of the wedge-shaped receptacle to extend under platform 116. Platform 116 further includes a pair of substantially rectangular cutouts 124 configured to allow mounting of data connection jacks 126, 127 thereto. More particularly, each of jacks 126, 127 is secured to a mounting plate 128 by a bezel 130. The mounting plate 128 is then secured to platform 116 by a screw 132. The positioning of platform 116 locates cutouts 124 above cutouts 96 in receptacle plate 84 such that cables 134, 135 extending from jacks 126, 127 pass through cutouts 96, through aperture 82 of spacer 60 and into second passage 47 of body 20. As a result, the cables extending from both data jacks are directed into a common passage of body 12.

Poke-through device 10 further includes a cover assembly 136. Cover assembly 136 in turn includes a mounting ring 138 which is secured to platform 116 via four screws 140 which extend through apertures 142 in the mounting ring and engage four threaded apertures 144 formed in platform 116. In one preferred embodiment, the mounting ring is cast from zinc. The cover assembly further includes a floor plate 146 defining an access opening 148. The cover assembly further includes a pair of pivotally mounted doors 150, which pivot between a closed position wherein access opening 148 is entirely closed and an open position wherein access to the receptacles and/or data jacks may be accomplished. Floor plate 146 is attached to mounting ring 138 via four screws 152 which extend through apertures 154 formed in the cover plate and engage threaded apertures 156 formed in the mounting ring. In one preferred embodiment, doors 150 include an integrally formed hinge pin 158 which may be sandwiched between the floor plate and the mounting ring during assembly and which preferably engages a cooperating groove 160 formed in one of such components. As a result, doors 150 are hingably secured to the cover assembly.

The device of the present invention therefore locates the receptacles and/or data jacks a distance $D_2$ below floor 14 (see FIG. 7). As a result, unsightly and dangerous above-floor outlet boxes or connector boxes are not required, and such connectors themselves may also be safely located at least substantially below floor level. More to the point, the upper surface of the receptacle/data jacks are located a distance below doors 150 when such doors are in their closed position. Thus, application of forces to the doors in their closed position does not result in transfer of such forces to the receptacles/data jacks as is common in prior art poke-throughs, and which is often capable of damaging such components.

Figure 9:
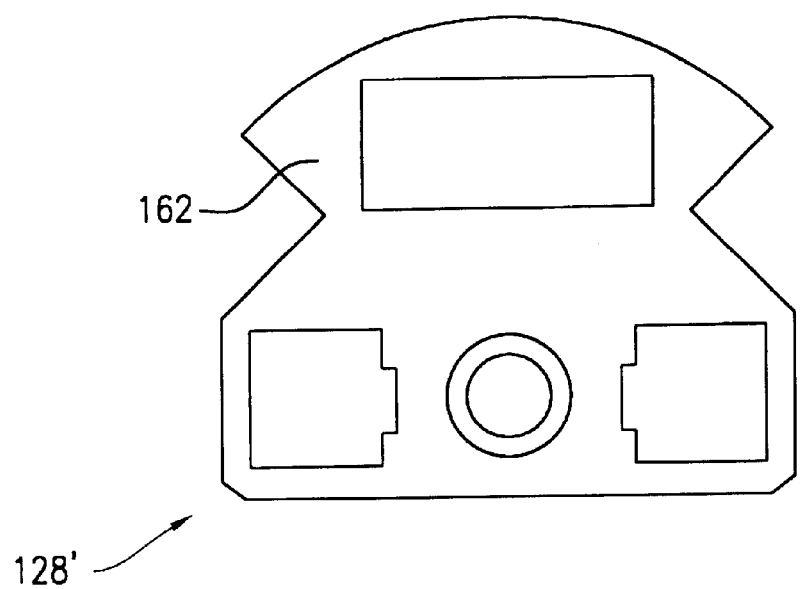
FIG. 9 is a plan view of the alternative mounting plate utilized in the embodiment of FIG. 6.

The novel design of the present invention allows the device to be readily modified to meet various requirements. It is therefor contemplated that the device of the present invention may be marketed as a kit which allows adaptation of the device in the field to meet various electrical requirements. For example, referring to FIG. 6, the poke-through device, i.e., device 10' may be modified to provide only a single receptacle, e.g., receptacle 99, and a total of 4 data jacks. It will be appreciated that the illustrated data jacks are standard category 5 data jacks, and that use of a different size jack might allow mounting of more or less of such jacks. Device 10' utilizes platform 116 of device 10, but utilizes a mounting plate 128' rather than mounting plate 128. As shown, mounting plate 128' includes a wing 162 which allows the mounting of two additional category 5 data jacks in the region formerly occupied by receptacle 98 (see also FIG. 9).

Figure 6:
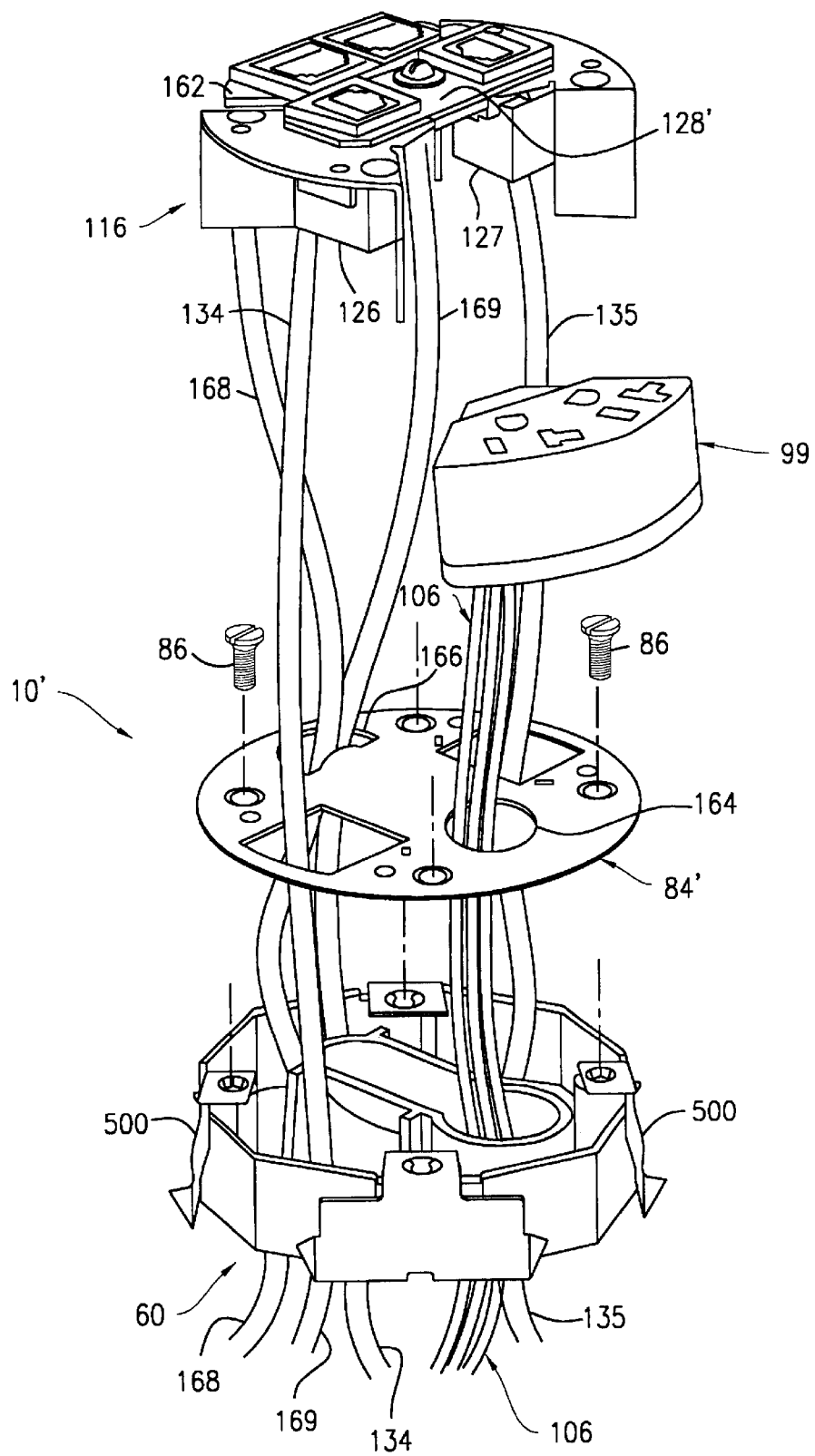
FIG. 6 is an enlarged, exploded detail of an alternative embodiment of the present invention.

As will recognized by those skilled in the art, the wires supplying power to the receptacle must remain electrically insulated from the cables which communicate with the data jacks. Accordingly, the device of FIG. 6 utilizes an alternative receptacle plate, i.e., receptacle plate 84'. Receptacle plate 84' is similar to plate 84, but for the removal of key-shaped aperture 94. As shown in FIG. 6, plate 84' includes an aperture 164 for passage of wires 106 therethrough. As discussed hereinabove with respect to device 10, these wires extend through aperture 80 of spacer 60 and into passage 46 of body 20. Plate 84' further includes a moon-shaped aperture 166, which when plate 84' is secured to spacer 60, is located behind elevated end 78 of channel 76. Cables 168, 169 extending from jacks 170, 171, respectively, therefore extend through aperture 166, and are then fed through aperture 81 of spacer 60 and into passage 47 of body 20. As a result, all of the cables communicating with the data jacks are grouped together for travel through a common passage in body 20.

Figure 10:
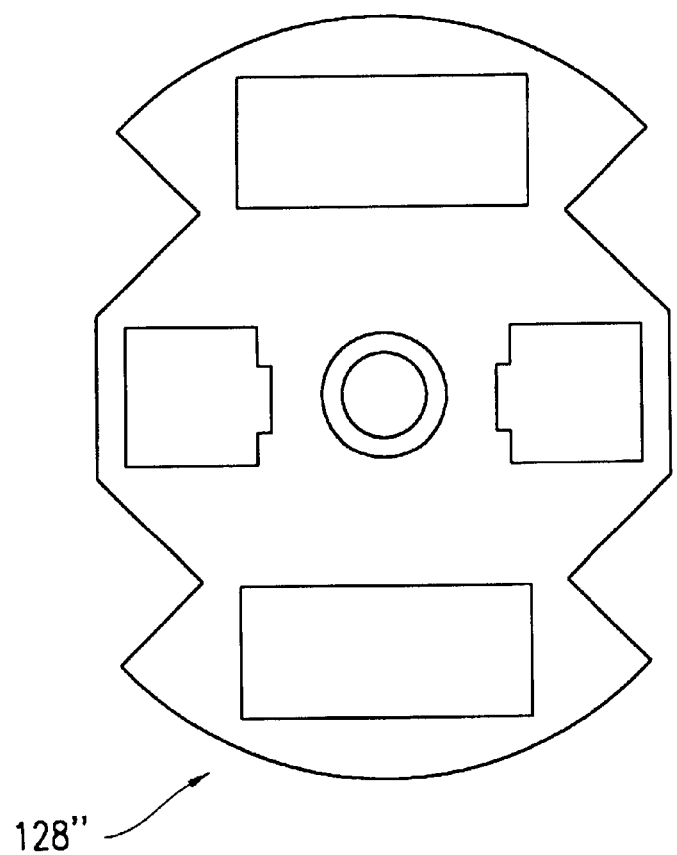
FIG. 10 is a plan view of still another alternative mounting plate used in the poke-through device of the present invention.

In one additional embodiment, mounting plate 128' is replaced with mounting plate 128" of FIG. 10. In this embodiment, both receptacles are removed from the device, and the device is fitted with six category 5 data jacks. Because there are only data cables in such device, there in no need to electrically insulate the cables extending through body 20. As a result, either plate 84 or 84' may be used with this embodiment.

To increase the resistance of the poke-through to heat exposure, additional intumescent material may be incorporated into the device. For example, the size of passage 46, 47 may be reduced by utilizing intumescent dividers having a greater cross-sectional thickness and/or incorporating additional portions of intumescent material into the body of the poke-through. In addition, intumescent material may be used to fill a portion of the interior volume defined by spacer 60. The incorporation of this additional intumescent material into both the body and spacer of the poke-through devices provides added protection for the receptacles and/or data jacks positioned thereabove, thus increasing the length of time that the poke-through device can resist exposure to heat.

Figure 11:
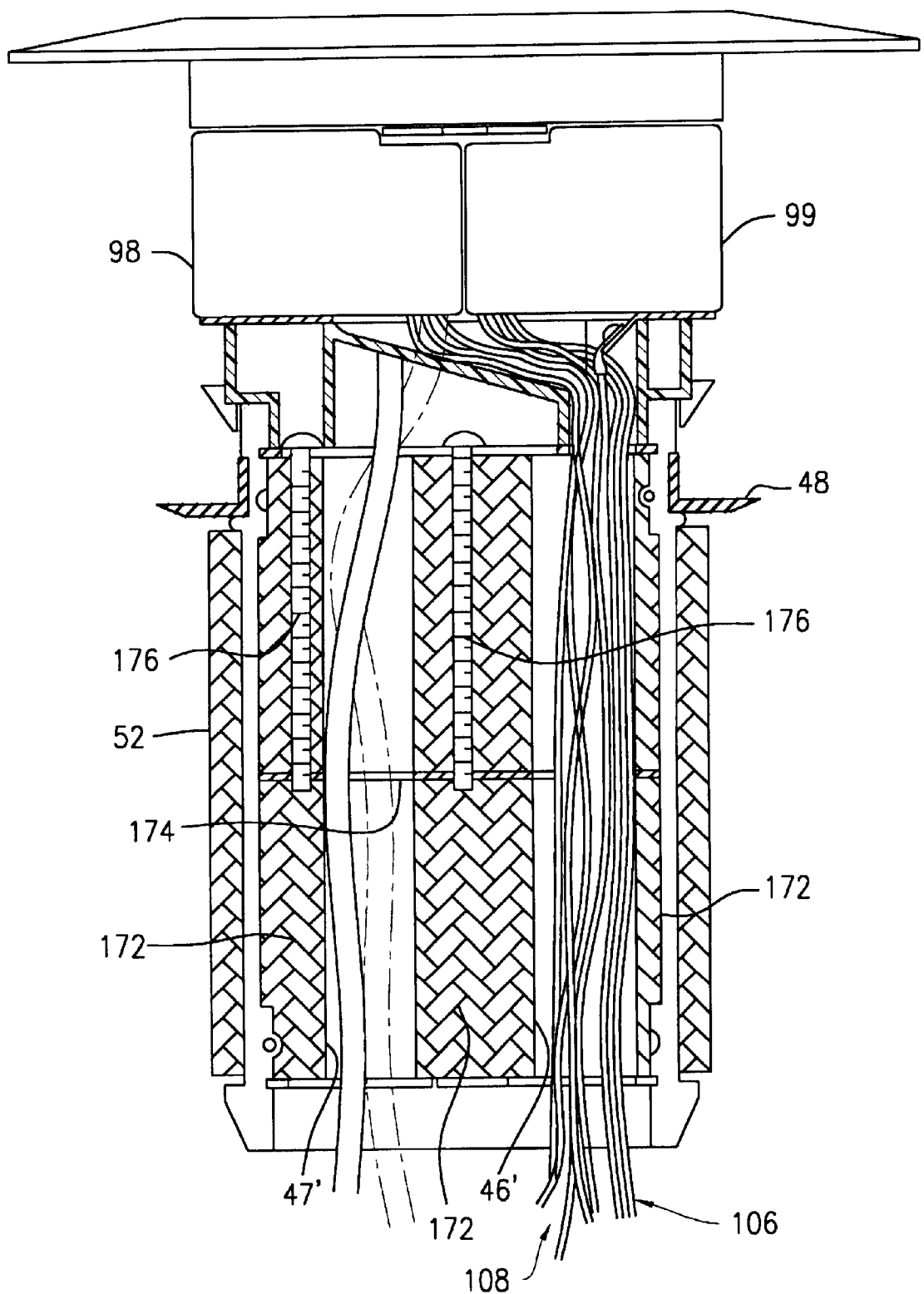
FIG. 11 is a view similar to FIG. 7 showing an alternative embodiment of the present invention.

In another preferred embodiment, as shown in FIG. 11, body 20 is assembled without dividers 44, 45. Thereafter, a liquid intumescent material 172 is poured into the body to fill the interior volume thereof. The intumescent material is then allowed to set. After hardening, passages 46', 47' are formed, e.g., by drilling through body 20. Preferably, an additional plate 174 is located within body 20 intermediate plates 24 and 28. Plate 174 is suspended from plate 24 by a plurality of screws 176. As a result, plate 174 serves to support the intumescent material located thereabove and retain such material within the body of the poke-through during prolonged exposure to heat. The liquid intumescent material may also be used to fill a portion of the interior volume of spacer 60. As will be appreciated by those skilled in the art, the method of pouring intumescent material into the partially assembled poke-through device decreases the assembly time, and eliminates sizing and/or tolerance problems associated with fitting separately-formed intumescent dividers into the body of the device, and increases the resistance of the device to heat exposure by filling open voids within the body with intumescent material.

While there have been described what are presently believed to be the preferred embodiments of the invention, those skilled in the art will realize that various changes and modifications may be made to the invention without departing from the invention, and it is intended to claim all such changes and modifications as fall within the scope of the invention.

What is claimed is:

1. A concealed poke-through device for installation in a hole in a floor structure, said floor structure defining a floor in a first working environment and a ceiling in a second working environment, said second working environment including a junction box, comprising:
   a body having upper and lower ends and sized for insertion within said hole, said upper end including a generally circular receptacle-mounting region, said mounting region defining four substantially equal-sized locating quadrants, at least one of said quadrants including two electrical outlets, and wherein said lower end communicates with said junction box whereby electrical power may be supplied to said outlets.

2. The device according to claim 1, further comprising a first receptacle; and
   wherein said outlets are provided on said receptacle.

3. The device according to claim 2, wherein said first receptacle is formed with a wedge configuration.

4. The device according to claim 3, further comprising a data jack positioned within one of the other quadrants of said mounting region.

5. The device according to claim 3, further comprising a second wedge-shaped receptacle, said second receptacle being positioned within the quadrant opposite from said first receptacle.

6. The device according to claim 5, further comprising a first data jack positioned within one of the two quadrants adjacent said receptacles and a second data jack positioned within the other of the two quadrants adjacent said receptacles.

7. The device according to claim 6, wherein said receptacles each include an upper surface providing access to said outlets and said data jacks each define a plane substantially parallel to said upper surface, and wherein both said upper surfaces and said planes are spaced a distance below said floor whereby said receptacles and data jacks are recessed with respect to said floor and thereby protected from environmental hazards.

8. The device according to claim 2, wherein said receptacle is formed with a bow-tie configuration whereby said receptacle spans two opposing quadrants; and
   wherein each of said two opposing quadrants includes two electrical outlets.

9. The device according to claim 8, further comprising a data jack positioned within one of the two quadrants adjacent said receptacle.

10. The device according to claim 8, further comprising a first data jack positioned within one of the two quadrants adjacent said receptacle and a second data jack positioned within the other of the two quadrants adjacent said receptacle.

11. The device according to claim 10, wherein said receptacle includes an upper surface providing access to said outlets and said data jacks each define a plane substantially parallel to said upper surface, and wherein both said upper surface and said planes are spaced a distance below said floor whereby said receptacle and data jacks are recessed with respect to said floor and thereby protected from environmental hazards.

12. The device according to claim 2, wherein said receptacle includes an upper surface providing access to said outlets, and wherein said upper surface of said receptacle is spaced a distance below said floor wherein said receptacle is recessed with respect to said floor and thereby protected from environmental hazards.

13. The device according to claim 12, further comprising a cover assembly including a floor plate and at least one hingably mounted access door, said floor plate defining an access opening, said door movable between a closed position wherein said receptacle is enclosed within said device and an open position wherein said receptacle may be accessed from said first working environment, and wherein said door in its closed position is spaced from said upper surface of said receptacle whereby forces applied to said closed door are not transferred to said receptacle.

14. The device according to claim 1, wherein said body has a generally tubular configuration, and wherein said hole in said floor structure is a substantially circular opening having an approximately four inch diameter, and wherein said outlets are configured to accept electrical plugs.

15. A recessed poke-through device for installation in a hole in a floor structure, said floor structure defining a floor in a first working environment and a ceiling in a second working environment, said second working environment including a junction box, comprising:
   a tubular body having upper and lower ends and sized for insertion within said hole, said upper end defining an interface mounting region, said lower end adapted to electrically communicate with said junction box;
   an intumescent sleeve surrounding said body;
   an electrical interface mounted in said interface mounting region, said interface having an upper surface facing said floor, said upper surface being spaced a distance below said floor;
   a cover assembly including a floor plate and at least one access door, said door movable between a closed position wherein said interface is enclosed within said device and an open position wherein said interface may be accessed through said hole, said door having an inner surface which defines a plane parallel to said upper surface when said door is in said closed position, and wherein said upper surface of said interface is recessed a distance below said plane of said door when said door is in said closed position whereby forces applied to said closed door are not transferred to said interface.

16. The device according to claim 15, wherein said at least one door includes a hinging pin integrally formed therewith, and wherein said floor plate is configured to capture said pin therebelow thereby rotatably securing said at least one door to said cover assembly.

17. The device according to claim 16, wherein said cover assembly further includes a mounting ring positioned between said upper end of said body and said floor plate, and wherein said hinging pin is captured between said mounting ring and said floor plate.

18. The device according to claim 17, wherein one of said mounting ring and said floor plate includes a groove sized to receive said hinging pin of said door.

19. The device according to claim 18, wherein said interface is selected from the group consisting of electrical outlets and data jacks.

20. The device according to claim 19, wherein said interface mounting region includes four outlets and two data jacks mounted thereto, and wherein two of said outlets are located on one side of said interface mounting region and the other two of said outlets are located on the opposite side of said interface mounting region.

21. A concealed poke-through device for installation in a hole in a floor structure, said floor structure defining a floor in a first working environment and a ceiling in a second working environment, said second working environment including a junction box, comprising:
   a body having upper and lower ends and sized for insertion within said hole, said lower end communicating with said junction box;
   a spacer secured to said upper end of said body and defining an interface mounting region;
   a plurality of electrical interfaces mounted in said interface mounting region, said electrical interfaces selected from the group consisting of electrical outlets and data jacks;
   wherein said spacer includes a channel extending across the center of said spacer for receiving electrical wires from a first electrical interface located on a first side of said mounting region and for directing said wires to a second side of said region opposite said first side.

22. The device according to claim 21, wherein said spacer defines adjacent substantially equal-sized first, second, third and fourth quadrants, and wherein said first quadrant includes a first aperture extending through said spacer and communicating with said body, said channel extending from said third quadrant to said first quadrant and terminating at said first aperture whereby electrical wires communicating with said first and third quadrant are bundled together as said wires extend through said first aperture in a direction away from said mounting region.

23. The device according to claim 22, wherein said spacer further includes a second aperture extending through said spacer and communicating with said body, said second aperture located in one of said second and fourth quadrants whereby electrical wires communicating with said second and fourth quadrants are bundled together as they extend through said second aperture in a direction away from said mounting region.

24. The device according to claim 22, wherein said spacer further includes a second aperture spanning said second and fourth quadrants and extending through said spacer to communicate with said body, and wherein said channel is configured such that said second aperture is continuous from said second quadrant to said fourth quadrant.

25. The device according to claim 24, further comprising a receptacle plate, said receptacle plate including a key-shaped aperture sized to allow access to both said channel and said first aperture when said plate is secured to an upper portion of said spacer, said receptacle plate further including a pair of opposing cutouts located to allow access to said second aperture in said second and fourth quadrants.

26. The device according to claim 25, further comprising first and second wedge-shaped receptacles secured to said receptacle plate in said first and third quadrants respectively, each of said receptacles providing two electrical outlets, and wherein electrical wires communicating with the receptacle located in said third quadrant are received within said channel and directed to said first aperture in said spacer.

27. The device according to claim 26, further comprising a data jack support platform secured to said receptacle plate, said platform being spaced a distance from said receptacle plate and including cutouts for mounting of data jacks thereto, said platform being shaped to allow access to said receptacles from said first working environment.

28. The device according to claim 27, further comprising a cover assembly, said cover assembly including a mounting ring, a floor plate and at least one hingably mounted access door, and wherein said mounting ring is secured to said platform, and wherein said floor plate is secured to said mounting ring.

29. The device according to claim 28, wherein said access door includes a hinging pin, said hinging pin being sandwiched between said mounting ring and said floor plate to hingably secure said door to said device.

30. The device according to claim 29, wherein one of said mounting ring and said floor plate is formed with a groove sized to receive said hinging pin.

31. The device according to claim 30, further comprising a plurality of retainer clips for securing of said device within said hole, said clips being mounted about the periphery of said spacer.

32. The device according to claim 31, wherein each of said clips includes a mounting bracket, said mounting bracket being sandwiched between said spacer and said receptacle plate whereby said retainer clips are secured to said device.

33. In combination:
   a floor structure having upper and lower surfaces defining a floor thickness and having a poke-through receiving hole formed therein, said receiving hole extending in a direction generally perpendicular to said upper and lower surfaces; and
   a recessed poke-through device comprising:
      a body having upper and lower ends and sized for insertion within said hole, said upper end defining an interface mounting region, said lower end adapted to electrically communicate with a junction box;
      an electrical interface mounted in said interface mounting region, said interface having an upper surface facing said upper surface of said floor structure;
      a cover assembly including a floor plate and at least one access door, said door movable between a closed position wherein said interface is enclosed within said device and an open position wherein said interface may be accessed through said hole, said door having an inner surface which defines a plane parallel to said upper surface of said electrical interface when said door is in said closed position, and wherein said upper surface of said interface is recessed a distance below said plane of said door when said door is in said closed position whereby forces applied to said closed door are not transferred to said interface;
      said interface being retained in said receiving hole at a distance below said upper surface of said floor structure which is sufficient to prevent said interface, and a typical connector secured thereto, from interfering with objects and persons located on said upper surface of said floor structure.

34. The combination of claim 33, wherein said poke-through device further comprises at least one retainer clip secured to said device, said at least one retainer clip having an angled projection configured to permit easy insertion of device into said receiving hole and to substantially prevent subsequent withdrawal of said device from said receiving hole.

35. A recessed poke-through device for installation in a hole in a floor structure, said floor structure defining a floor in a first working environment and a ceiling in a second working environment, said second working environment including a junction box, comprising:

a tubular body having upper and lower ends and sized for insertion within said hole, said upper end defining an interface mounting region, said lower end adapted to electrically communicate with said junction box;

a portion of intumescent material cooperating with said body to limit travel of fire through said hole;

an electrical interface mounted in said interface mounting region, said interface having an upper surface facing said floor; and a cover assembly including a floor plate and at least one access door, said door movable between a closed position wherein said interface is enclosed within said device and an open position wherein said interface may be accessed through said hole, said door having an inner surface which defines a plane parallel to said upper surface when said door is in said closed position, and wherein said upper surface of said interface is recessed a distance below said plane to protect said interface from environmental hazards.

\* \* \* \* \*